Patented Apr. 4, 1939

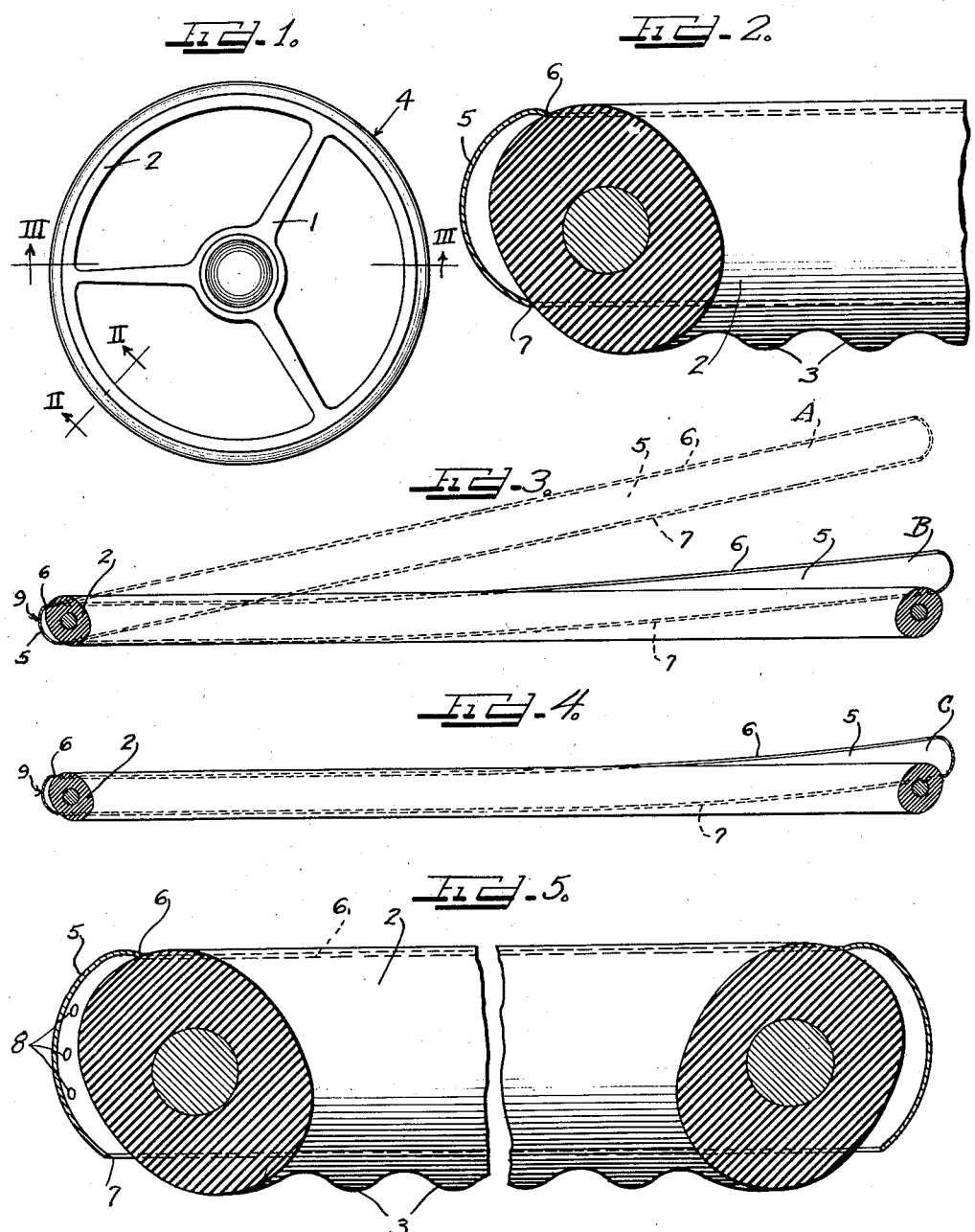

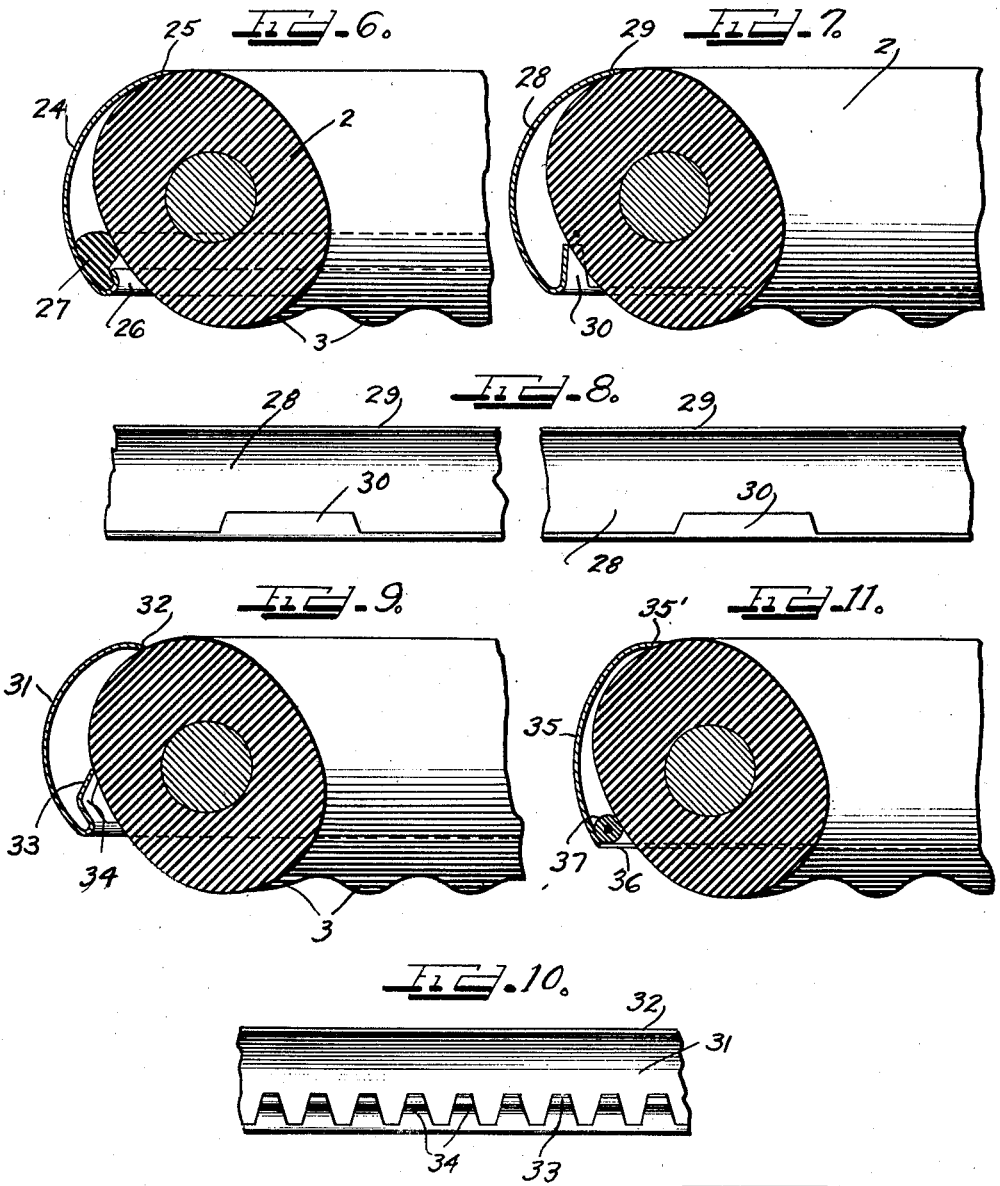

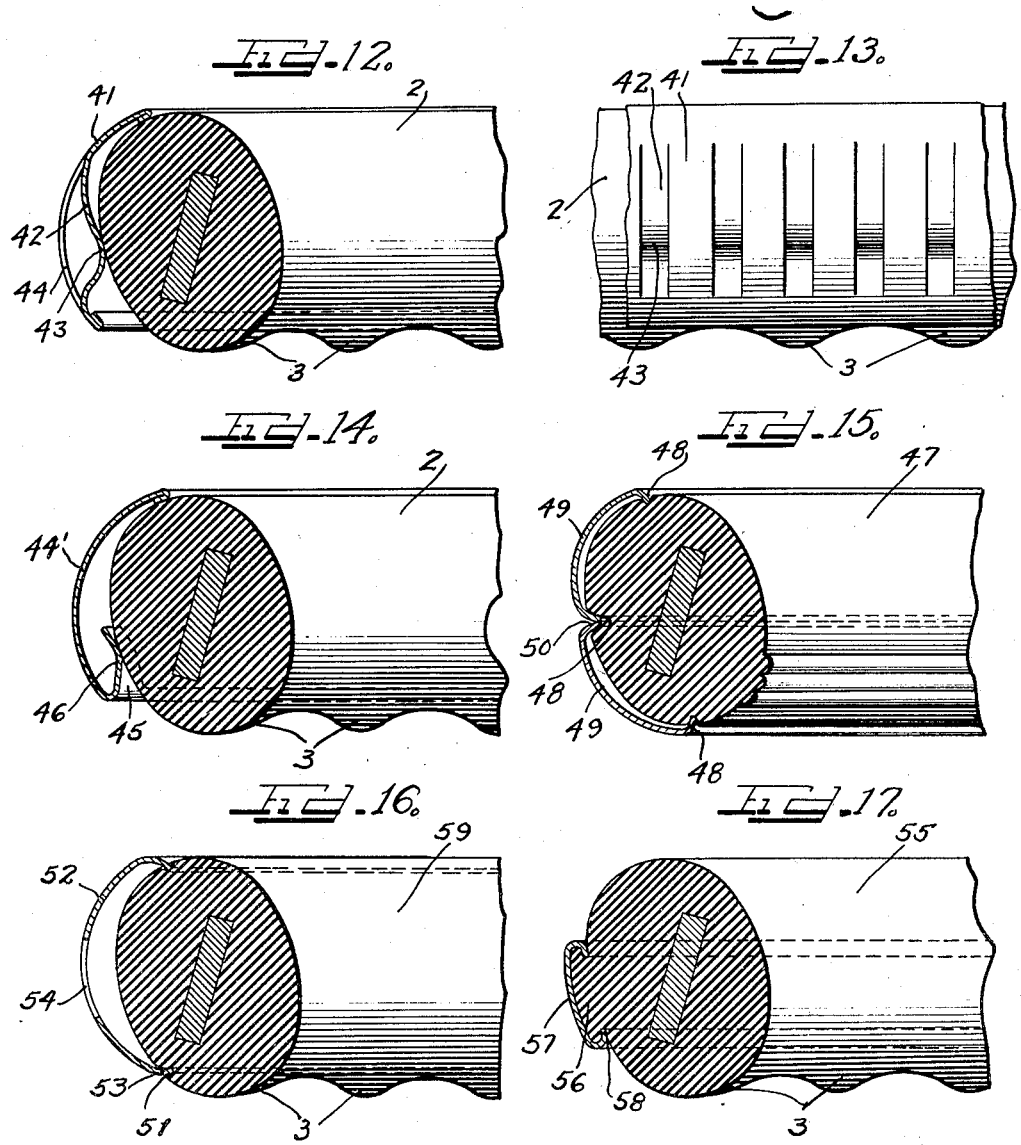

2,153,380

UNITED STATES PATENT OFFICE 2,153,380

METHOD OF MOUNTING ORNAMENTAL ACCESSORIES ON STEERING WHEELS

George Albert Lyon, Allenhurst, N. J.

Application November 25, 1936, Serial No. 112,664

4 Claims. (Cl. 153—1)

This invention relates to steering wheel constructions, and more particularly to a novel method of assembling an ornamental accessory on a steering wheel.

This is a continuation in part of my co-pending application for "Steering wheel construction", Serial No. 748,989, filed October 19, 1934, (Patent No. 2,081,593, granted May 25, 1937), and it is also a continuation in part of my co-pending application for "Steering wheel construction", Serial No. 731,805, filed June 22, 1934, (Patent No. 2,081,592, granted May 25, 1937).

As pointed out in my above referred to copending applications, hard rubber, wooden or all metal steering wheels are objectionable. Rubber wheels are very sticky, tacky and uncomfortable to the hand. Wooden wheels have the same objectionable features, and the finish on wooden wheels wears off after relatively short usage. Both wooden and rubber wheels cannot be made to harmonize with the interior appointments of an automotive vehicle, for example, to as great an extent as is desirable. All metal wheels are heavy, uncomfortable as to temperature and prohibitively expensive to manufacture with the desired finish thereon.

Accordingly, it is desirable to provide a steering wheel with a smooth, clean, metallic surface for contact with the hands of a user and, as also set forth in my aforementioned co-pending application, it has been found that this can best be done by way of applying a ring, band, bead or the like of metal or equivalent substance to the external surface of a wheel rim. Thus, economy of manufacture is maintained, and the resultant wheel construction, if used on an automotive vehicle, harmonizes in any desirable manner with the other interior appointments, and at the same time provides a construction that will maintain a pleasing appearance throughout considerable usage and will always present a clean, smooth surface for contact by the hands of a user.

It is an object of this invention to provide a novel method for mounting an ornamental accessory of the above described type on a steering wheel.

It is another object of this invention to provide a novel method of assembling an ornamental accessory on a wheel which is economical and which provides a resulting structure which is rugged and reliable in use.

A further object of this invention is to provide a novel steering wheel construction whereby a metallic band may be attached to the wheel in such a manner that the band will be in close proximity to the surface of the wheel along the edge portions of the band, yet the body of the band will be spaced from the wheel, the band being rolled into position and the wheel being standard without any special formation to accommodate the band.

A further object of this invention is to provide an ornamental ring or band for attachment to a steering wheel of such construction that the band may be initially passed over the maximum outer diameter of the wheel rim and then subsequently rolled into engagement with the wheel rim, leaving the main body portion of the ring or band in spaced relationship to the outer surface of the rim.

A still further object of this invention is to provide a band engageable over a wheel rim by gradually pressing it away from an initial point of contact, the band being secured to the wheel rim after such pressing engagement thereof.

Another object of this invention is to provide a novel method for attaching an ornamental means to a steering wheel, which means thickens the composite structure after attachment, affording a comfortable grip somewhat resilient in character when squeezed, but more than amply firm and rigid for proper handling of the wheel.

Another and further object of this invention is to provide a new and novel method of making a ring, band, bead, annular member or the like for attachment to the external surface of an object.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawings, in which:

Figure 1 is a plan view of a composite steering wheel construction embodying principles of the present invention;

Figure 2 is an enlarged fragmentary transverse sectional view of the structure shown in Figure 1, taken substantially as indicated by the line II—II of Figure 1, and illustrating the composite structure completed;

Figure 3 is an enlarged transverse central sectional view, taken substantially as indicated by the line III—III of Figure 1, with the central portion of the steering wheel removed, illustrating an initial step in the application of the band to the steering wheel rim;

Figure 4 is a view similar to Figure 3 illustrating an advanced stage in the application of the band to the wheel rim;

Figure 5 is a greatly enlarged central sectional view similar to Figures 3 and 4, illustrating the next to the final stage in applying the band to the wheel rim;

Figure 6 is a view similar to Figure 2, showing a band construction including a resilient member for engagement with a wheel rim;

Figure 7 is a view similar to Figure 6, showing a band construction including substantially resilient teeth for engagement with a wheel rim;

Figure 8 is substantially a development view of the band structure shown in Figures 7, showing the band laid out substantially in the flat, the view being an elevation of the interior of the band;

Figure 9 is a view similar to Figure 7, illustrating another form of a toothed band;

Figure 10 is a fragmentary elevational view of the interior of the band shown in Figure 9;

Figure 11 is a view similar to Figure 9, illustrating still another form of construction;

Figure 12 is a view similar to Figure 2, showing a composite steering wheel construction to which the attached member is removable and replaceable at will;

Figure 13 is a fragmentary outside elevational view of the structure shown in Figure 12;

Figures 14, 15 and 16 illustrate further forms of steering wheel construction which may be assembled according to the method of the present invention; and Figure 17 is a fragmentary vertical sectional view of a composite steering wheel construction with a specially formed wheel rim, the ornamental member of which is susceptible of being mounted according to the prescribed method of the present invention.

As shown on the drawings:

At the outset, it may be best to note that the plan view of Figure 1 is so nearly illustrative of the composite steering wheel constructions shown in the other views, except, of course, for obvious variations, that it is not deemed necessary herein to illustrate the other composite constructions in kind.

While the composite steering wheel construction in the instance of Figure 1 and several of the other figures of the drawings is disclosed as including a wheel rim with a completely annular bead or band disposed therearound, it will be obvious that such bead or band may or may not have the ends thereof secured together to form a complete ring-like structure, but may, if so desired, extend only a portion of the way around the periphery of the wheel rim, and may, if so desired, be in the form of one or more annular portions with spaces therebetween, depending upon the exigencies of particular circumstances.

It is also to be understood that the band may be in the form of a split ring, forcibly expanded over the wheel rim and then permitted to contract into tight engagement with the wheel rim. The band may also be a continuous, endless band applied to the wheel rim by application of pressure away from an initial point of contact until the entire band is forced over the wheel rim. The preferable form for the band, however, is an initially split ring with the ends thereof butt-welded prior to the application of the band to the wheel.

Further, it is to be distinctly understood that while the steering wheel proper is shown in certain figures as being of a substantially oval cross-section, and in other figures as being of circular cross-section, the bands or rings applied to the wheel rims are not limited to the particular wheel rim with which a particular band may be illustrated herein, but any of the forms of the bands shown and described herein is applicable equally as well to a wheel rim of substantially any cross-sectional character desired.

In the illustrated embodiment of the present invention, seen in Figures 1 to 5, inclusive, there is shown a steering wheel 1, which may be of any standard construction, having a wheel rim 2, also of any desirable standard construction or any preferable cross-sectional characteristic or shape. In this instance, the cross-sectional shape of the rim is substantially oval, and along the undersurface thereof the rim is provided with the usual finger humps 3. An annular band, generally indicated in Figure 1 by reference numeral 4, is shown attached to the outer surface of the wheel rim 2. This annular band is preferably of relatively thin metallic stock, but may, of course, be of any suitable or equivalent material. As best seen in Figures 2 and 5, the band 4 does not completely encircle the wheel rim in a transverse direction, but preferably only overlies the upper outer portion of the wheel rim where it is in position to present a smooth, clean surface for contact by the hands of a user.

As best seen in Figures 2 and 5, the band 4 includes a transversely arcuate body portion 5 having an inwardly turned upper margin 6 and an inwardly turned lower margin 7. In this instance, the upper margin 6 projects inwardly beyond the lower margin 7, but it will be understood that either margin may project inwardly farther than the other, as may be deemed most desirable. If the upper margin projects inwardly the farthest, the band is preferably pressed down over the wheel rim from above, while if the lower margin projects inwardly the most, the band is preferably attached by pressing it over the wheel rim upwardly from below. The band is somewhat flexible in nature, and it will be noted that the lower margin 7 has an internal diameter somewhat less than the maximum outside diameter of the wheel rim 2. The band, however, can be gradually forced over the wheel rim so as to cause the margin 7 to pass by the outside maximum diameter of the wheel rim while the margin 6 intimately engages the wheel rim on the opposite side of the maximum diameter.

As illustrated in Figure 5, the body portion 5 of the band may, if so desired, be provided with ventilation apertures 8 therein, these apertures being arranged as shown in the form of a desirable design or in any other desirable manner. When attached, the body portion 5 of the band is preferably in spaced relationship to the outer surface of the wheel rim so that there is ample room for free circulation of air between the wheel rim and the body portion of the band.

The band is preferably formed in endless style prior to its application to the rim 2. Initially the band is cut from a sheet of flat stock and is then run through a suitable rolling mechanism wherein the body portion 5 is made arcuate, and the marginal edges 6 and 7 are given their desired shape. Preferably at least one of the marginal edges of the band 4 is folded inwardly at an angle. It is contemplated using a long strip of stock, and when the same has passed through the rolling mechanism it will assume a spiral shape as it comes out. It can then be cut off into portions of suitable lengths and will already have a tendency to assume a circular form.

A variation in the making of this annular band with substantially equal facility may also be adopted. After the initial rolling step, namely the arcing of the portion 5, the strip might then be cut into desired lengths, the ends of the strip being secured together and one or both of the marginal portions 6 and 7 folded inwardly in a pressing operation. Of course, it is apparent that either way of making the strip is not only rapid and labor saving, but exceedingly economical. A preferable method of applying the band to the rim is illustrated best in Figures 3 to 5, inclusive. The band is first preferably applied to the rim at an initial, relatively small area of contact, designated 9 in Figures 3 and 4, and the band is held in tight engagement with the rim at this initial point of contact. In this position, the upper margin 6 is somewhat lower than it will be when the band is ultimately in complete engagement with the rim. When engaged with the rim at the initial point of contact, the entire band will be in the dotted line position designated A in Figure 3. While holding the band in tight engagement with the rim at the initial point of contact, pressure is applied to the band at relatively small spaced intervals, preferably on both sides of the point of contact, gradually working the band over the rim away from the point of contact.

After one or more applications of pressure upon each side of the band, the band will then have assumed the position designated B in Figure 3, the opposite portion of the band from the point 9 being still above the rim. Continued working of the band away from the point 9 results in the band assuming the position designated C in Figure 4. After this position, it is a simple expedient to force the opposite or elevated portion of the band downwardly over the rim. This working or forcing operation of the band is necessary due to the fact, as above stated, that the lower margin 7 of the band is of slightly less diameter than the maximum outside diameter of the rim. After the band has been forced over the rim, the band will then be in the position seen in Figure 5. It will be noted that during the forcing of the band over the rim, the margin 6 of the band gradually works itself upwardly adjacent the initial point 9 so that it assumes intimate contact with the rim at a higher level than at which it was started.

With the band worked over the rim, it will be noted that the lower marginal portion 7 is in slightly spaced relationship from the rim (Figure 5), and so a rolling or kicking operation is preferably utilized to turn this marginal portion 7 into intimate contact with the rim as the same is seen in Figure 2.

With the completion of the rolling or kicking operation, the band is in firm engagement with the rim, both marginal portions 6 and 7 being in intimate engagement with the rim, and any pressure applied tending to force the band off the rim would cause the marginal portion 7 to bite into the rim, securely holding the band in position with these marginal portions engaged with the rim on opposite sides of the maximum outside diameter of the rim. The body portion 5 of the band will still be in spaced relationship to the outer surface of the rim, allowing sufficient air circulation through the openings 8 to adequately ventilate the band.

The intimate engagement of the margins 6 and 7 with the rim effectively prevents the turning of the band relatively to the rim, resulting in a composite construction operable as a unit. The rolling operation may be performed very expeditiously and very economically, giving a resultant composite steering wheel construction that harmonizes with the interior appointments of a vehicle, and that is clean, smooth and cool to the touch. In other words, such a composite steering wheel construction is not fatiguing to the hands, even after long usage, and there will be no tendency for the driver to remove his hands from the wheel due to tiresome or unpleasant feeling caused by the wheel.

In Figure 6, I have shown the same type of steering wheel 2, equipped with a band having a body portion 24, an inwardly turned upper margin 25 and a lower margin 26 reversely bent in spaced relationship to the body portion 24. Clamped between the body portion and the inwardly turned margin 26 is an annular resilient member 27 preferably of rubber or equivalent substance, designed to engage the outer surface of the wheel below the maximum outside diameter thereof. The resilient insert 27 is sufficiently flexible in nature to permit the forcing of the band downwardly over the wheel rim with a consequent distortion of the insert. Immediately upon forcing the band downwardly over the wheel rim, the insert will effectively grip the wheel rim and hold the band thereupon.

In Figures 7 and 8, I have shown the wheel rim 2 equipped with a band having a body portion 28, an upper inwardly extending margin 29 engaged with the surface of the wheel rim, and a plurality of spaced teeth 30 inwardly turned and extending at an angle to the arcuate body portion 28. These teeth 30 are preferably few in number and, as shown, are relatively wide, being positioned at relatively widely spaced intervals. The teeth 30 are sufficiently resilient to permit forcing them over the maximum outside diameter of the rim, and these teeth, as seen more clearly in Figure 11, extend inwardly at a proper angle for biting engagement with the rim below the maximum outside diameter thereof. Adequate ventilation openings are provided between the teeth. Any desirable number of such teeth may be utilized, but the preferable number is four spaced substantially ninety degrees apart. Of course, after the band has been once applied to the wheel rim, it is substantially impossible to remove the band without destructive action either to the band or to the rim. The band 28 may be applied to the rim very efficiently in the manner above described in connection with Figures 1 to 5, inclusive.

In Figures 9 and 10, I have shown a still different form of band for application to a wheel rim 2. The band in this instance includes a transversely arcuate body portion 31 having an inwardly turned upper margin 32 for tight engagement with the wheel rim above the maximum outside diameter thereof, and also a plurality of inwardly turned teeth 33 at relatively narrow spaced intervals. These teeth are preferably bent outwardly in an intermediate portion thereof, as indicated at 34. Such bending reduces the internal diameter of the nibs of the teeth and causes these nibs to extend inwardly at an angle suitable for biting engagement with the surface of the wheel rim beneath the maximum outside diameter. The lessening of the internal diameter of the nibs of the teeth permits the teeth, which are substantially resilient in character, to be forced over the maximum outside diameter of the wheel rim in the manner above described in connection with Figures 1 to 5, inclusive. After such placing of the band over the wheel rim, no rolling or kicking operation is necessitated, and the teeth effectively bite into the surface of the wheel rim, preventing removal of the band. Adequate ventilation openings are provided between the teeth.

Figure 11 illustrates a still different form of band applid to a wheel rim 2. In this instance, the band comprises a body portion 35 having a rather sharply inwardly turned upper margin 35' for intimate engagement with the surface of the rim. The lower margin 36 of the band is spaced from the wheel rim, and just within this margin is an annular resilient contractible element 37. The lower margin 36 may be turned inwardly to a sufficient extent to insure the holding of the contractible element 37. This contractible element preferably comprises an inner spring wire covered with a wrapping of rubber or some similar resilient material, and the member is so arranged as to tightly embrace the wheel rim below the maximum outside diameter thereof. This member may either be provided as a part of the band prior to the forcing of the band over the wheel rim, or may be stuffed into the space between the band and rim after the band has been placed in position. If the latter method is utilized, the band is preferably kicked inwardly after application to turn the lower margin 36 and to turn the upper margin 35 inwardly to a greater extent, the body portion 34 of the band being somewhat flattened in this kicking or rolling operation.

In Figures 12 and 13 another composite structure is shown in which the annular member is removable from and replaceable on the wheel rim 2. The annular member includes an outwardly arcuate portion 41 spaced from the wheel rim 2, except for the upper and lower edges thereof. Struck inwardly at spaced intervals from the body of the portion 41 are a plurality of gripping members 42. Each of these gripping members is bent inwardly and provided with a rounded reverse bend 43 for resilient gripping engagement with the surface of the wheel rim. The formation of each gripping member provides an aperture 44 suitable for ventilating purposes, and these apertures fully insure easy and positive gripping of the steering wheel structure without interfering to an undue extent with sliding of the wheel through the hands.

In Figure 14, I have shown a construction comprising an annular member which includes an outwardly arced portion 44' and an inwardly turned marginal portion 45 having a plurality of spaced teeth 46 therearound. The spaces between the teeth 46 provide adequate ventilation in the interior of the annular member. The teeth 46 differ from those of either Figure 7 or Figure 9 in that their outer extremities are bent away from the wheel rim 2 rather than into biting engagement therewith. In the present form, the inherent resiliency of the teeth and the frictional engagement thereof with the rim 2 effectively secure the annular member 44' to the rim 2. This form of annular member may also be applied as described in connection with Figures 1 to 5.

In Figure 15, I have shown a different form of construction which may be conveniently built up at the factory. In this instance, a specially formed wheel rim 47 is utilized, this rim having a plurality of spaced grooves 48 formed in the external surface thereof, the annular member being in the form of two annular shells 49, each outwardly arced and each provided with a pair of inwardly turned margins 50 seated in the grooves 48. The two confronting margins 50 are seated in the same central groove 48. The two annular shells 49 are secured to the wheel rim by a rolling or spinning process, such as described in connection with Figures 1 to 5.

Another factory-built permanent composite structure is shown in Figure 16, which also includes a specially formed wheel rim 59 provided with a pair of spaced grooves 51. The annular member includes an outwardly arced portion 52 normally in spaced relationship to the wheel rim, and inwardly bent marginal portions 53 are engaged in the grooves 51. This annular member is also rolled or spun upon the wheel rim. The annular member is further provided with one or more ventilation apertures 54 to eliminate a dead air space between the annular member and the wheel rim.

Still another factory-built composite structure is shown in Figure 17, in which is used a specially formed wheel rim 55 having a relatively narrow annular projection 56 on the outer surface thereof. This projection 56 is preferably substantially T-shaped in cross-section. The annular member in this instance is in the form of a closely fitting band 57 having a pair of inwardly turned marginal portion 58 formed around the upper and lower projecting annular beads on the part 56. The band 57 is also attached by a rolling or spinning process.

From the above description, it will be apparent that I have provided an extremely simple and novel method of mounting ornamental accessories on steering wheels and the like. The various constructions described above illustrate the wide variety of ornamental members which may be mounted on steering wheels according to the method of the present invention.

While I have shown particular embodiments of my invention, it will, of course, be understood that I do not wish to be limited thereto, since many modifications may be made, and I therefore contemplate by the appended claims to cover all such modifications as fall within the true spirit and scope of my invention.

I claim as my invention:

1. The method of mounting a metallic band to a steering wheel rim, with the central body portion of the band spaced therefrom, which includes pressing a band whose edge diameters are slightly less than the maximum outside diameter of said rim over the rim until one of the edges of said band is in engagement with the outer surface of the rim, and then rolling the opposite edge of said band into direct contact with said rim while leaving the central body portion of said band spaced from said rim.

2. The method of completing a steering wheel construction, which includes mounting on a wheel rim a metallic band having inwardly turned marginal portions whose clearance diameters are slightly less than the maximum outside diameter of said rim, by pressing one of said marginal portions of the band over said maximum outside diameter of the rim, and then rolling at least one of said marginal portions into direct oblique engagement with said wheel rim said marginal portions being one on each side of said maximum diameter.

3. The method of applying a transversely arcuate band to a steering wheel rim where the maximum outside diameter of the rim is slightly greater than the inner edge diameters of the band, which includes pressing said band into intimate engagement with said rim at one relatively small area with the band extending at an angle to said rim, retaining the band and rim engaged at said area, working said band onto said rim both ways from said area until that portion diametrically opposite said area is pressed into position, the edge of the band which has been forced over said rim being spaced from said rim at this stage, and rolling said last mentioned edge of said band obliquely into contact with said rim.

4. The method of making a composite steering wheel structure, consisting of forming a wheel rim with a transverse curvature, separately forming an annular member from a flat strip by rolling said strip into a transversely arcuate form of different radius than the curvature of said wheel, folding a marginal portion of said strip inwardly at an angle, longitudinally curving said strip, and pressing the thus formed member over said wheel rim causing said inwardly folded marginal portion to grippingly engage said rim beneath the other portion of said member.

GEORGE ALBERT LYON.